(12) United States Patent
Lechner et al.

(10) Patent No.: US 8,038,813 B2
(45) Date of Patent: Oct. 18, 2011

(54) HEAT-GENERATING MIXTURE AND DEVICE AND METHOD FOR HEAT GENERATION

(75) Inventors: Peter Simon Lechner, Oberasbach (DE); Ulrich Bley, Fürth (DE); Rainer Hagel, Erlangen (DE); Aleksej Hoschenko, Fürth (DE)

(73) Assignee: Ruag Ammotec GmbH, Furth (DE)

( * ) Notice: Subject to any disclaimer, the term of this patent is extended or adjusted under 35 U.S.C. 154(b) by 1129 days.

(21) Appl. No.: 10/548,601

(22) PCT Filed: Mar. 15, 2004

(86) PCT No.: PCT/EP2004/002661
§ 371 (c)(1),
(2), (4) Date: Aug. 18, 2006

(87) PCT Pub. No.: WO2004/080251
PCT Pub. Date: Sep. 23, 2004

(65) Prior Publication Data
US 2007/0034201 A1    Feb. 15, 2007

(30) Foreign Application Priority Data

Mar. 13, 2003 (DE) .................................. 103 11 400

(51) Int. Cl.
*C06B 33/00* (2006.01)
*D03D 23/00* (2006.01)
*D03D 43/00* (2006.01)

(52) U.S. Cl. ................. 149/109.4; 149/37; 149/108.2; 149/109.2

(58) Field of Classification Search ............. 149/109.4, 149/37, 108.2, 109.2; 51/298
See application file for complete search history.

(56) References Cited

U.S. PATENT DOCUMENTS

| | | | | |
|---|---|---|---|---|
| 3,035,950 A | * | 5/1962 | Long | 149/19.91 |
| 3,311,459 A | * | 3/1967 | Jones et al. | 149/15 |
| 5,064,483 A | * | 11/1991 | Zeuner | 149/35 |
| 5,741,999 A | * | 4/1998 | Kazumi et al. | 149/35 |
| 6,267,110 B1 | | 7/2001 | Teneboum | |

FOREIGN PATENT DOCUMENTS

| | | |
|---|---|---|
| DE | 856953 | 11/1952 |
| GB | 572573 | 10/1945 |
| GB | 575575 | 2/1946 |
| JP | 11-310504 | 11/1999 |

OTHER PUBLICATIONS

Database WPI Section Ch, Week 200007 Derwent Publications Ltd., AN 2000-075368 XP002286490 and JP 11 310504 A, Sanko Kagaku Kogyo KK, Nov. 9, 1999.
International Preliminary Report dated Mar. 2, 2006 in English.

* cited by examiner

*Primary Examiner* — James McDonough
(74) *Attorney, Agent, or Firm* — Antonelli, Terry, Stout & Kraus, LLP.

(57) ABSTRACT

The invention relates to a heat-generating mixture, to a method and a device for generating heat, especially for heating food such as water, coffee, etc.

2 Claims, No Drawings

HEAT-GENERATING MIXTURE AND DEVICE AND METHOD FOR HEAT GENERATION

BACKGROUND OF THE INVENTION

The invention relates to a heat-generating mixture and to a method and a device for heat generation, especially for heating foodstuffs such as water, coffee, instant meals, etc.

Heat generation by the thermite process is known per se in traditional welding technology. However, thermite cannot be used in heat generation for foodstuffs because it forms a molten ball that can lead to mechanical instability to the point of melting through the casing of the device for heat generation.

U.S. Pat. No. 6,267,110 B1 discloses a disposable heating unit for a food container. As the heat-generating mixture, the device disclosed in this document also contains components that react together spontaneously at room temperature when they are brought into contact with one another, at least one of these components being in liquid form.

DETAILED DESCRIPTION OF THE INVENTION

The object of the present invention was therefore to provide heat-generating mixtures that overcome the disadvantages of the state of the art.

The solution according to the invention provides a heat-generating mixture containing one or more of the constituents metal silicide, iron oxide and silicon, optionally together with additives and processing aids such as silicon dioxide or water glass. The heat-generating mixture according to the invention is accommodated in a device which contains, in and/or on a casing, inter alia in addition to the substance to be heated, a booster charge and an igniter capable of being actuated mechanically or electrically, preferably piezoelectrically. The casing can be made of metal and/or plastic. If necessary, in the heat generation according to the invention, the booster charge is ignited by the igniter and in turn reliably and uniformly ignites the heat-generating mixture according to the invention. In a suitable mechanical casing, the slow and smoke-free combustion of the heat-generating mixture heats e.g. water, The thermomechanical stresses on the casing are markedly reduced because, on burning, a desirable non-melting, porous slag is formed in which the beads of iron cannot combine to form a molten ball. The temperature and the time taken to reach the maximum temperature can be controlled by way of the formulation, the amount of mixture used, the amount of water and/or the type of mechanical casing. Thus, for example, 25 g of the mixture according to the invention heat 125 ml of water from 20° C. to 98° C. within 60 seconds in a suitable apparatus.

Only solids that do not react with one another at room temperature are used in the heat-generating mixture according to the invention, in the associated booster charge and in the igniting mixture. The heat-generating mixture used according to the invention is e.g. a mixture containing 40 to 55 wt. % of metal silicide, preferably calcium silicide and/or iron silicide, 40 to 60 wt. % of iron(III) oxide, 0 to 10 wt. % of silicon, and additives and processing aids such as silicon dioxide or water glass. The booster charge for the heat-generating mixture can consist e.g. of mixtures containing light metals such as titanium, magnesium and/or aluminium, and metal silicides such as calcium silicide and/or iron silicide, iron oxide, silicon and additives, or other mixtures known from the state of the art. The igniters used for the booster charge are preferably anvil-shaped igniter caps that are capable of being actuated mechanically and are based on igniting mixtures free of lead and heavy metals. These are known from the state of the art and contain e.g. potassium dinitrobenzo-furoxanate or diazodinitrophenol, tetrazene, zinc peroxide, nitrocellulose, and additives such as powdered glass and titanium. The heat-generating mixtures according to the invention are prepared by methods known per se: the components are mixed in the indicated amounts and optionally compressed. The same applies to the igniting mixture and the booster charge.

The batch formulations are illustrated by the Examples below without thereby limiting the invention:

TABLE 1

Heat-generating mixture

| Example 1.1 | Example 1.2 | Content [wt. %] |
| --- | --- | --- |
| Calcium silicide | Iron silicide | 40-55 |
| Iron(III) oxide | Iron(III) oxide | 40-60 |
| Silicon | Silicon | 0-10 |
| Silicon dioxide | Silicon dioxide | 0-5 |
| Water glass | Water glass | 0-20 |

TABLE 2

Booster charge

| Example 2.1 | Example 2.2 | Content [wt. %] |
| --- | --- | --- |
| Magnesium | Titanium | 10-30 |
| Calcium silicide | Calcium silicide | 25-35 |
| Silicon | Silicon | 0-10 |
| Iron(III) oxide | Iron(III) oxide | 40-55 |
| Additives: | Additives: | |
| Binder | Binder | 0-10 |
| Silicon dioxide | Silicon dioxide | 0-10 |
| Graphite | Graphite | 0-10 |
| Boron nitride | Boron nitride | 0-10 |

TABLE 3

Igniting mixture

| Example 3.1 | Example 3.2 | Content [wt. %] |
| --- | --- | --- |
| Potassium dinitro-benzofuroxanate | Diazodinitrophenol | 20-40 |
| Zinc peroxide | Zinc peroxide | 20-40 |
| Tetrazene | Tetrazene | 0-10 |
| Titanium | Titanium | 0-20 |
| Nitrocellulose | Nitrocellulose | 0-40 |
| Powdered glass | Powdered glass | 0-20 |

The following compositions may be mentioned as preferred embodiments without thereby excluding other possible formulations:

| | | |
| --- | --- | --- |
| Heat-generating mixture: | iron silicide: | 48 wt. % |
| | iron(III) oxide: | 50 wt. % |
| | silicon: | 2 wt. % |
| Booster charge: | magnesium: | 20 wt. % |
| | calcium silicide: | 30 wt. % |
| | silicon: | 3 wt. % |
| | iron(III) oxide: | 47 wt. % |

| -continued | | |
|---|---|---|
| Igniting mixture: | potassium dinitro-benzofuroxanate: | 30 wt. % |
| | zinc peroxide: | 25 wt. % |
| | tetrazene: | 5 wt. % |
| | titanium: | 5 wt. % |
| | nitrocellulose: | 35 wt. % |

The heat-generating mixture according to the invention can be used e.g. to prepare for consumption foodstuffs such as water, coffee, instant meals, etc., in a suitable device.

The invention claimed is:

1. Heat-generating mixture, comprising 48 wt. % of iron silicide, 50 wt. % of iron (III) oxide and 2 wt. % of silicon, characterized in that it, on burning, it forms a non-melting, porous slag.

2. Heat-generating mixture according to claim 1, characterized in that, on burning, it does not form a molten ball.

* * * * *